Sept. 28, 1943.  W. W. POSEY  2,330,447
HYDRAULIC GATE VALVE
Filed Dec. 27, 1940  2 Sheets-Sheet 1

INVENTOR.
WALTER W. POSEY
BY *James M. Heiman*
ATTORNEYS.

INVENTOR.
WALTER W. POSEY
BY *James M. Heilman*
ATTORNEYS.

Patented Sept. 28, 1943

2,330,447

UNITED STATES PATENT OFFICE 2,330,447

HYDRAULIC GATE VALVE

Walter W. Posey, East Lampeter Township, Lancaster County, Pa.

Application December 27, 1940, Serial No. 371,943

4 Claims. (Cl. 137—144)

One of the objects of this invention is to provide a valve assembly for hydraulic dredge lines which valve assembly will shut off one side of the line and permit pipe to be added to that line or the direction of the flow changed, while at the same time permitting the other line and hence the dredge to continue operating.

Another object of this invention is to provide means whereby the gate valves forming the valve assembly can be easily shifted from open to closed positions simply by one man opening a few auxiliary valves.

A further object is to use the pressure in the discharging dredge line as a motivating means to open and close the gate valves.

A still further object is to provide means so that one of the branches of the line will be continually opened and, hence, eliminate any damage to the pipe line by reason of both gates being closed at the same time.

A further object is to provide a piston with packing or a gasket therein so that little or no leakage past the packing occurs, and to form the lower end of the piston so that it will scrape off any mud or sediment which previously had not been washed off by the pressure of the water.

Other and further objects will be apparent from a reading of the following:

Figure 1:
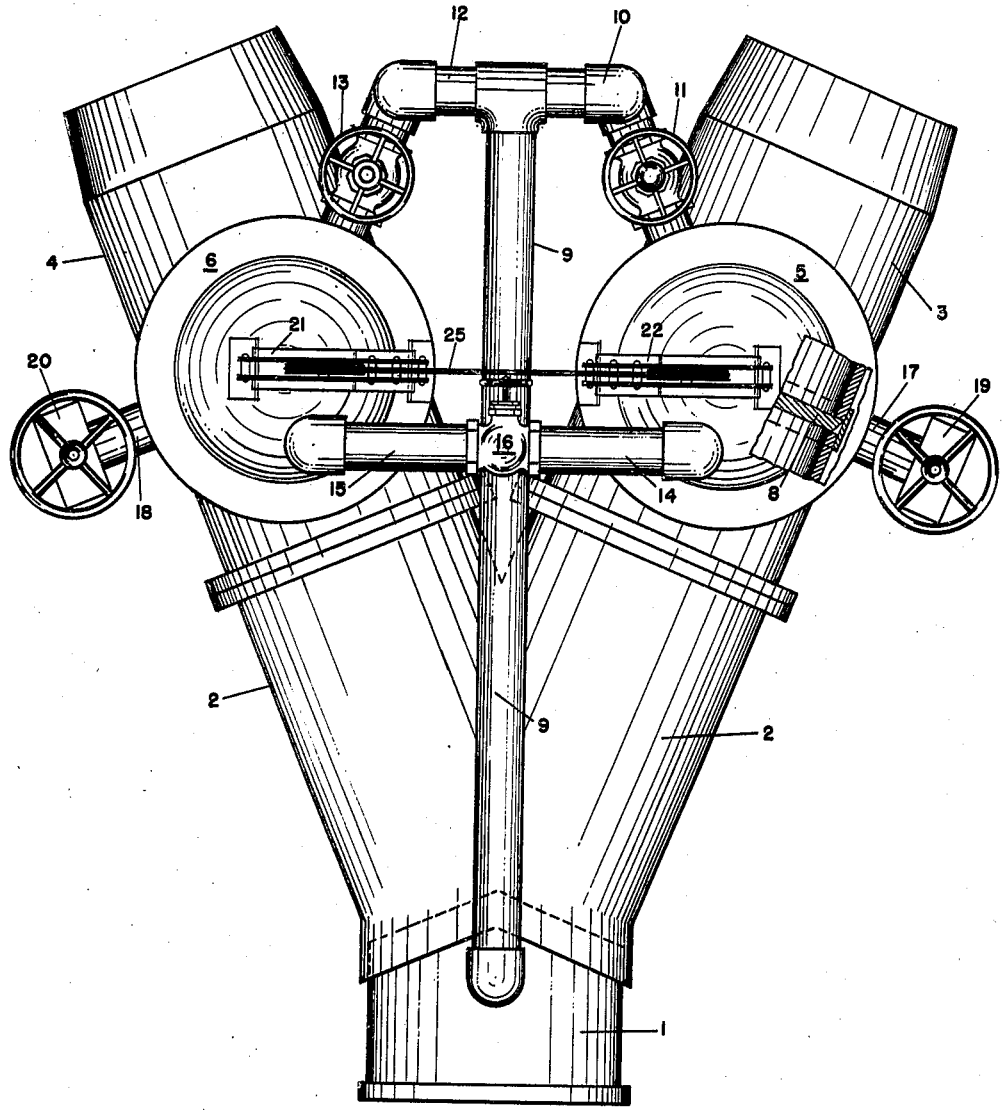
Fig. 1 is a top plan view of the entire valve assembly showing one of the gate valves in sections.

In dredging operations for river work there is generally what is known as pontoon pipe, supported on pontoons, which carries the water, mud, grit, gravel, and stones from the dredger to the shore. At the shore, the pontoon pipe is connected to shore or land pipe which carries the material from the pontoon pipe to the place where it is to be deposited.

The shore pipe line is generally very short when the dredging operation starts and as the cuts or swamps are filled with the deposited sediment, additional pipe is laid until by the end of the operation a very long pipe line results. For a complete discussion of this problem see copending application by the same inventor, Serial No. 355,787, which issued into Patent No. 2,267,168 on December 23, 1941.

It has been the practice heretofore whenever additional pipe has been added to a line or the direction of a line has been changed that the dredger and the entire system has had to shut down. In certain cases, Y connections were used and valves were also used to shift the discharge from one branch to the other. These valves and their manual operating mechanisms were crude, and dirt and mud would adhere to the various elements and prevent their operation. In most cases, even when several men attempted to move the valve, the dredger had to stop until the gate valve was opened or closed.

Applicant has used and experimented with valves suitable for use in dredge pipe and which are operated manually by means of levers or a screw. These valves soon become inoperative because of grit and dirt getting through the openings and causing the valves to "freeze" to the housing.

This saving of time may not seem important, but when it is considered that the rental for dredgers is exceedingly high, i. e., from approximately $60,000 to $120,000 per month, it can readily be seen that an improvement which prevents stoppages of this sort is of far reaching importance.

In the present invention the various operating elements are simple and therefore are less likely to be out of order. No external power is needed inasmuch as the pressure for operating the valves is taken directly from the discharge line in which pressure is supplied by the dredger. This pressure is exceedingly high at the first Y branch which may be near to the dredger, and is still high at subsequent Y joints even though they are quite some distance from the dredger. On some dredging operations one Y branch is sufficient. However, on other operations many Y branches are used.

Applicant desires to claim any and all advantages which are inherent in his device. It will be understood that the invention is susceptible of embodiment in various forms, one of which is illustrated in the accompanying drawings and that the structural details herein set forth may be varied to suit particular purposes without departing from the spirit of the invention. However, it is not intended that the invention should be limited by the drawings or by any description, but to be limited only by the broadest possible scope of my invention.

Looking at Fig. 1 of the drawings, numeral 1 represents shore pipe to which a Y branch is attached. Shore pipe 3 and 4 are secured to each leg of the Y. Cylindrical bonnets 5 and 6 are secured to shore pipe 3 and 4 respectively. These bonnets each house a piston 7 and a gate valve 8.

The hydraulic take-off power line is indicated by numeral 9 which through connection 10 and valve 11 enters bonnet 5 beneath the piston. Likewise, through connections 12 and valve 13, power is supplied to the under side of piston 7 in bonnet 6.

Relief of pressure on the under side of piston 7 is effected through discharge pipe 17 and 18 and valves 19 and 20. The check or control line comprises pipe 14 and 15 and control valve 16.

Supports 21 and 22 are attached to bonnets 6 and 5 respectively and carry sheaves or pulleys 23 and 24 respectively, over which a chain or cable 25 passes. Cable 25 is attached to piston rod 27 at the one end and piston rod 26 at the other end. These piston rods are secured to pistons 7 which, in turn, are secured to the gate valves 8.

Bands 28 encircle the lower half of pipe 3 and 4 from the point where the bonnet joins the pipe. These bands provide a bottom for the pocket into which the gate valves fit, and together with the pipe form a stop against which the gate valves may abut and thus resist the force produced by the dredger.

Relief valves 19 and 20 comprise a handle 29 attached to a screw threaded rod 30 on the lower end of which rides a slide valve 31. When the handle is turned, the valve will ride up the rod and thus open the relief outlet.

Figure 2:
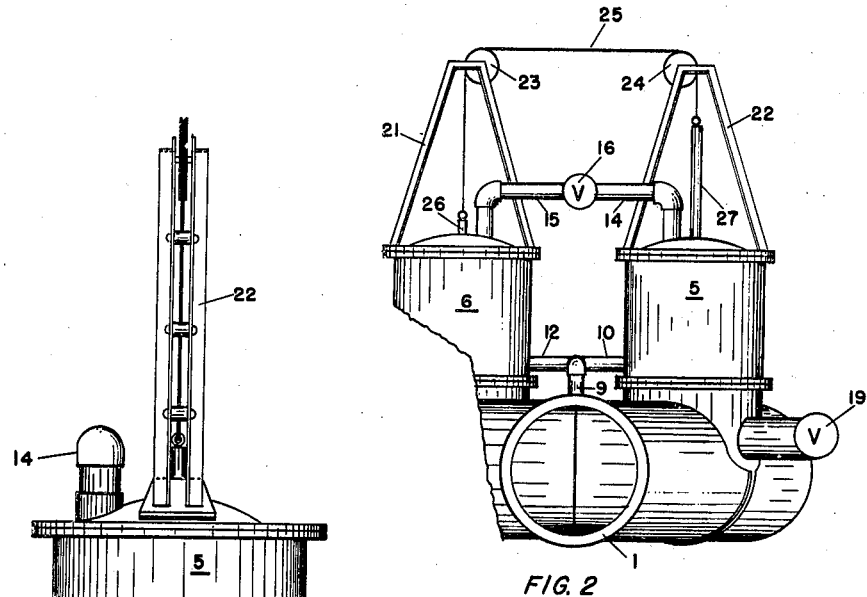
Fig. 2 is a front elevation of the device.
Figure 3:
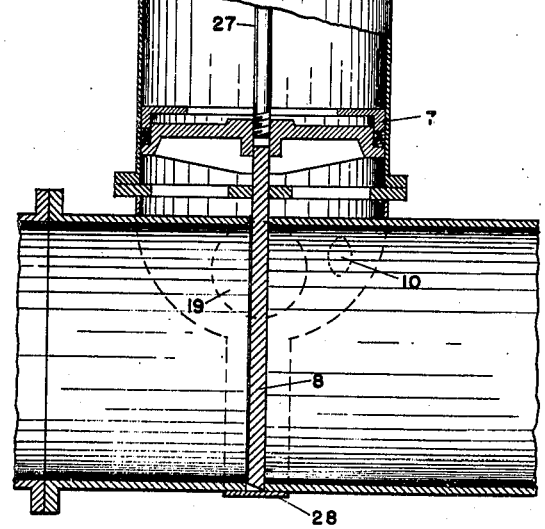
Fig. 3 is a side elevation of the device showing certain of the elements in sections.
Figure 4:
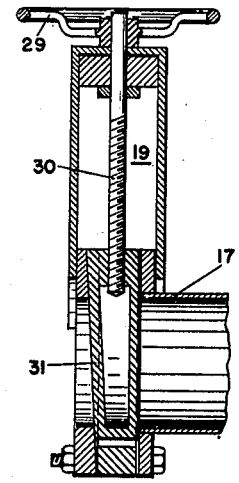
Fig. 4 is a sectional view of one of the relief valves.

The operation of the invention is as follows:

Assume that the valves are in the position shown in Fig. 2, i. e., that the right branch is open and the left branch is closed, and it is desired to close the right branch and open the left branch. The first step is to remove the pressure beneath the piston in bonnet 5. This is done by closing pressure valve 11 and then opening relief valve 19.

The second step is to apply pressure beneath the piston in bonnet 6. This is done by closing relief valve 20 and then opening pressure valve 13.

The third and final step is to open or regulate control valve 16 and permit the piston in bonnet 6 to rise and force the oil or other liquid which is above the piston in the upper portion of the bonnet to pass through pipe line 14, 15 and force the piston and gate valve in bonnet 5 downwardly. After the pistons have completed their movement, control valve 16 should be closed. If not closed at this point, the operator may neglect to close it before beginning the next operation.

To again open pipe line 3, the reverse procedure takes place; i. e., close pressure valve 13, open relief valve 20, close relief valve 19, open pressure valve 11, open control valve 16, and finally close control valve 16.

As is readily apparent, after the pistons and gate valves have completed their movement, and the control valve 16 has been closed, the various pressure and relief valves may be opened or closed in preparation for the next shift.

Ordinarily the pressure in the dredge line would be insufficient to lift the piston and valve unless it were counterbalanced by the other piston and valve. Hence, chain or cable 25 is used to connect the two pistons.

Another advantage of the cable is that it makes it impossible to close both valves at the same time and thus damage the dredger or the pipe line.

Control valve 16 is desirable, although not necessary, because without it, when the pistons start moving they gather a lot of momentum and are capable of damaging the pipe line. A brake on the pulleys or the piston rod would work, but would not be as satisfactory as the liquid control line.

Various obvious modifications could be made in this device. For example, pressure pipe 9 which is attached to the base of the Y could be attached to the forward end of pipe 3 and 4 and feed directly into the bonnet. Likewise, branch pipes 10 and 12 could be so arranged as to feed into the forward side of the bonnet instead of from the rearward side. Also, control pipes 14, 15 and valve 16 could be deleted with a corresponding sacrifice of smooth and efficient operation.

It is clearly apparent that applicant has invented a device comprising a small number of rugged parts coacting together to utilize pressure from the pipe line itself to open and close gate valves by means of an easy, simple, and foolproof mechanism.

What I claim is:

1. In a dredge line having a plurality of legs with closure means in each leg, means for actuating said closure means, said actuating means comprising a pipe line adapted to conduct pressure from said dredge line to operate said closure means, and flexible means connecting said plurality of closure means to facilitate the movement of said closure means.

2. In a dredging device, a discharge line, a Y branch line, a bonnet positioned on each leg of the Y branch line, a piston in each bonnet, closing means carried by said pistons, piston rods connected to said pistons at one end, a flexible element connected to the other end of said piston rods in such a manner that one of said pistons and closing means moving in one direction will cause the other of said pistons and closing means to move in the opposite direction, a pressure line connected at one end to the line and at the other end to each of said bonnets, means in said pressure line to direct the pressure to said bonnets, relief means secured to said bonnets, and control means whereby the rise and fall of said pistons and said closing means can be controlled.

3. In a dredging device, a discharge line, a Y branch line, a bonnet positioned on each leg of the Y branch line, a piston in each bonnet, closing means carried by said pistons, a pressure line connected at one end to the line and at the other end to each of said bonnets, means in said pressure line to direct the pressure to said bonnets, relief means secured to said bonnets, and control means, said control means comprising a flexible connection so constructed and arranged that when one piston rises, the other piston falls.

4. In a pipe line having a branch, an extension positioned on each leg of the Y branch, a piston in each extension, closing means operated by said pistons, a pressure line connected at one end to the line and at the other end to each of said extensions, means in said pressure line to selectively direct the pressure to said extensions, relief means secured to said extensions, and control means to regulate the rise and fall of said pistons and said closing means, said closing means being connected together so that when one closing means is closing, the other closing means is opening.

WALTER W. POSEY.